Sept. 4, 1945.    W. C. TRAUTMAN    2,384,054
LANDING GEAR
Filed Sept. 26, 1941

INVENTOR
WALTER C. TRAUTMAN
BY H. W. Breleford
ATTORNEY

Patented Sept. 4, 1945

2,384,054

UNITED STATES PATENT OFFICE 2,384,054

LANDING GEAR

Walter C. Trautman, Burbank, Calif., assignor, by mesne assignments, to Bendix Aviation Corporation, South Bend, Ind., a corporation of Delaware Application September 26, 1941, Serial No. 412,469

2 Claims. (Cl. 244—102)

This invention relates to a landing gear for airplanes, and more particularly to a retractable wheel strut.

It is an object of the invention to provide a retractable wheel strut having an automatically operable locking member to hold it in an operative position.

It is another object to provide a retractable strut having a retracting motor, the initial motion of which unlatches the locking member.

A further object is to provide a strut having a pivot about which the strut is rotated to effect retraction of the strut, and having a pivotally mounted retracting and extending motor connected thereto whereby the motor rotates as the strut rotates on is retracting motion.

Still another object is to provide a strut having a retracting motor rotatable on a pivot shaft wherein power is supplied to the motor through its pivot shaft.

Another object is to provide a strut having a moveable retracting motor which is supplied with power through non-flexible conduits.

Still another object is to provide a retractable wheel strut of novel and simplified construction.

Figures 1, 2, 3, 4:
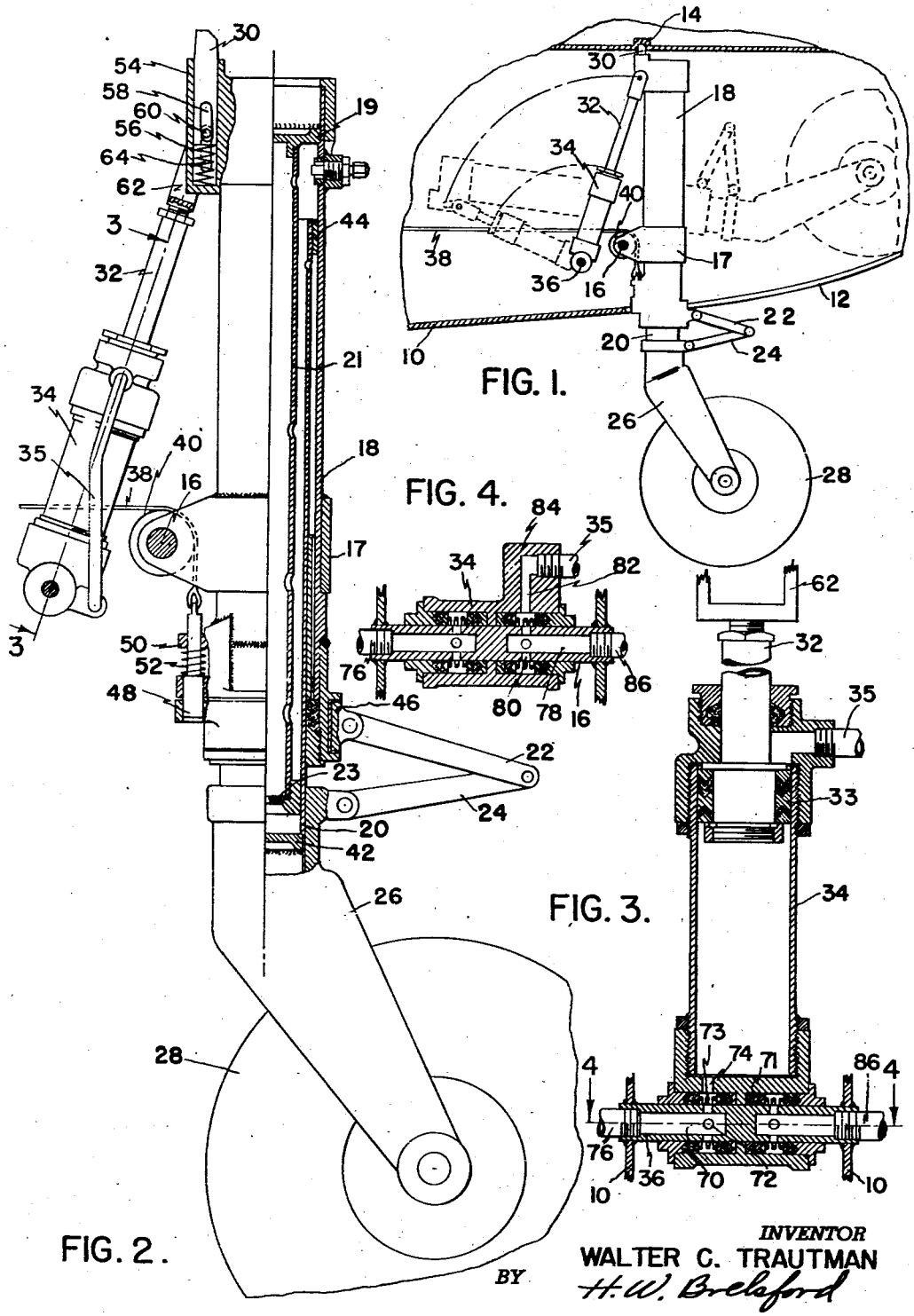
Figure 1 is a view in elevation of part of an airplane in vertical section in which is mounted a wheel strut made in accordance with the present invention. The operative position of the strut is shown in full lines and retracted position of the strut is shown in broken lines.
Figure 2 is an elevation view partly in section of the strut of Fig. 1, together with its retracting motor.
Figure 3 is a sectional view along the lines 3—3 of Fig. 2 showing the construction of the retracting and extending motor.
Figure 4 is a sectional view along the line 4—4 of Fig. 3 showing the details of the fluid paths at the pivot of the motor.

Referring to Fig. 1, an airplane 10 having an opening 12 on the undersurface thereof, has a step or recess 14 seen in the open part of Fig. 1. The part of the airplane shown is a tail section and the invention is illustrated as a tail wheel, although it could also be shown as a main wheel or nose wheel. Mounted in airplane 10 is a transverse pivot shaft 16, on which is pivotally mounted a collar 17 rigidly secured to an outer cylinder 18 of an airplane shock strut. At the lower end of cylinder 18 and telescoping therein is a cylinder 20. Mounted on the lower end of cylinder 20 is a wheel fork 26 to which is secured an airplane landing wheel 28. Fork 26 and cylinder 18 are kept from relative rotation by torque arms 22 and 24 fastened to cylinder 18 and to fork 26 respectively.

The cylinder 18 is held in an upright position by a lock pin 30 in the upper end of cylinder 18 fitting into step 14 of the airplane 10. The strut as a whole is rotated in retraction or extension by a piston-cylinder motor 34 having a piston rod 32 connected to cylinder 18 and lock pin 30. Piston cylinder motor 34 is pivotally mounted on a transverse pivot shaft 36 secured to the airplane 10. A cable 38 which is actuated by the pilot of the airplane, passes around a pulley 40 mounted on pivot shaft 16, and is secured to a centering latch pin on the shock strut, the construction of which will be later explained.

Referring to Figure 2, the parts already described are readily identified. The collar 17 pivots about shaft 16, and is rigidly fastened to the outer cylinder 18. Welded to the upper end of cylinder 18 is a partition 19 to which is secured a perforated cylinder 21 which supports a metering orifice partition 23 on its lower end. In the lower end of telescoping cylinder 20 is a partition 42 forming a part of a chamber for retaining hydraulic fluid which is metered through the orifice partition 23 when the shock strut is operating to absorb the shock of landing of the airplane 10. Screwed on the top of telescoping cylinder 20 is a bearing ring 44 which centers the upper end of cylinder 20 in cylinder 18.

Although torque arm 24 is securely fastened to fork 26, it will be noted that the torque arm 22 is fastened to a collar 46 rotatably mounted on cylinder 18. Collar 46 may be kept from rotation, however, by a centering latch pin 48 held in an ear 50 welded to the outer side of cylinder 18. A spring 52 normally urges the centering latch pin 48 into engagement with the rotatable ring 46 to prevent relative rotation of the ring 46 to the cylinder 18. When in this position, the fork 26 is held from relative rotation to the cylinder 18. If, however, the pilot should pull on wire 38 and withdraw pin 48 against the compression of spring 52, the wheel 28 would then have a free castoring action such as is desirable in maneuvering an airplane in a hangar.

The details of construction of the lock pin 30 are also shown in Fig. 2. The pin 30 is longitudinally moveable in a housing 54 secured to the upper end of cylinder 18, and the pin 30 is urged upwardly by a compression spring 56 retained in housing 54. The pin 30 has axial slot 58 through which passes a pin 60 secured to a forked member 62 on the upper end of piston rod 32. Pin 60 passes through the head 54 also, through a slot 64 in the housing 54, which slot is shown in dotted outline just below the bottom end of lock pin 30. This construction allows the initial rotation of the retracting motor 34 to pull the pin 30 downwardly to disengage it from step 14 (Fig. 1) unlocking the cylinder 18 and allowing it to rotate to a retracted position, shown in dotted outline in Fig. 1.

The details of construction of the retracting motor 34 are shown in Fig. 3. In this figure is shown the pivot shaft 36 rigidly secured to the airplane 10. The shaft 36 has an axial passage 70 in the left end, which has radial bores 72 leading therefrom and communicating with the bottom end of cylinder 34 through a passage 74. A hydraulic conduit 76 is connected to the outer end of passage 70. Suitable packing surrounds pivot shaft 36 near the radial bores 76 and may be of the Chevron type 71 held by a compression spring 73. Also shown in Fig. 3 is the piston rod 32 having secured to the lower end, a piston 33. Fluid passes to the upper side of piston 33 through a conduit 35 fastened to the cylinder 34.

The details of construction of the hydraulic fluid path to conduit 35 are shown in Fig. 4. An axial passage 78 in the right end of pivot shaft 16 communicates with radial bores 80 therein which in turn communicate with a passage 82 drilled in a projection 84 of the cylinder 34. Chevron packing 71 spread by compression spring 73 also seals the pivot joint near radial bores 80. Conduit 35 in turn is secured to projection 84, and passes upwardly to the upper end of cylinder 34 as shown in Fig. 2. A hydraulic conduit 86 passes fluid to the outer end of axial passage 78.

From the foregoing description it will be apparent that there are no flexible conduits necessary for the motor 34 to accommodate its rotation as it retracts or extends the strut. This feature is important in eliminating a source of wear and therefore future trouble in the retracting motor.

The construction of the locking pin 30 with relation to the retracting motor 34 and its pivot rod 32 allows the locking pin 30 to move freely into step 14 as the strut is extended. This construction also allows the retracting motor to unlock the strut with its initial motion, rather than having a separate unlocking device.

In operation, the strut is extended as shown in full lines in Fig. 1, the lock pin 30 fitting in the step 14 to hold the strut in an upright position. Upon landing the pilot will usually desire a non-castoring action from the wheel shown, which is a tail wheel, although it could be a main wheel of an airplane as far as this invention is concerned. After the airplane is landed, and the pilot desires to maneuver the airplane to enter a hangar or to get off of a runway he will pull upon wire 38 which will withdraw centering latch pin 48, allowing the ring 46 to rotate freely on outer cylinder 18. The torque arms 22 and 24 will not then prevent relative rotation of the wheel with relation to the strut 18. Upon take-off the pilot will probably not desire a swivel action, and will allow the pin 48 to connect the ring 46 to the cylinder 18.

When the airplane has left the ground upon take-off, the pilot will then desire to retract the wheel to reduce the aerodynamic friction of the airplane. By manual operation of a hydraulic valve (not shown) he will cause fluid to flow into conduit 86 which passes fluid into passage 78, with axial bores 80 into passage 82 (Fig. 4) and into conduit 35 which leads to the upper part of the cylinder 34 as shown in Fig. 3. At the same time conduit 76 is opened to exhaust. Fluid then acts upon the upper surface of piston 33 forcing it downwardly, displacing fluid out through conduit 76, and causing piston rod 32 and fork 62 secured thereto to pull pin 60 (Fig. 2) downwardly. Pin 60 will then slide freely in slot 64 pulling pin 30 downwardly until it is removed from the step 14 (Fig. 1). When the pin 60 reaches the bottom end of slot 64 it will then pull against the cylinder 18, causing it to rotate about its pivot shaft 16 to the position shown in dotted outline in Figure 1. In this position the strut is now completely retracted, offering no resistance.

Upon landing the pilot will desire to extend the strut, and for this purpose will operate a manual valve (not shown) to pass fluid to conduit 76, and to exhaust conduit 86. Fluid will then press against the upper end of slot 64 in head 54, rotating the strut as a whole to the upright position shown in full lines in Fig. 1. When the strut near its upright position, the pin 30 will strike part of the airship in which is formed step 14, and will be forced downwardly by this part of the airplane, slot 86 therein allowing relative movement of lock pin 30 with regard to pin 60. At the extreme extension position the pin 30 will slip into step 14, and the strut as a whole will be locked in an operative position.

Although this invention has been described with reference to a particular embodiment thereof it is not desired to limit the invention to this embodiment, or limit it in any other way except by the terms of the following claims.

I claim:

1. In an airplane, a wheel strut installation comprising, a shaft, a wheel strut pivotally mounted thereon, a pin mounted on the upper end of said wheel strut and having an elongated slot therein, the strut being recessed to receive the pin and being slotted in a like direction with the pin, resilient means urging said pin outwardly from said strut, a lock step in said airplane engageable by the pin to lock the strut in an operating position, an actuating cylinder separate from said strut and pivotally mounted in said airplane, and a pin passing through said strut and pin slots to form a lost motion connection between them and the actuating cylinder, so that the pin is withdrawn upon the initial movement of the actuating cylinder in retraction and the pin may be depressed upon extension to engage the lock step.

2. An airplane wheel strut assembly comprising, a wheel strut adapted to be pivotally mounted, a slidable lock pin on the upper end thereof, the movement of which is limited by stops, resilient means urging said pin outwardly from said strut, and a separate actuating cylinder connected directly to said pin to retract and extend said strut, said connection being a lost-motion connection to allow the pin limited depressing action upon extension, and to permit unlocking the pin upon retraction.

WALTER C. TRAUTMAN.